July 21, 1931.   B. CATALINE ET AL   1,815,612
VALVE SPRING
Filed Oct. 19, 1927
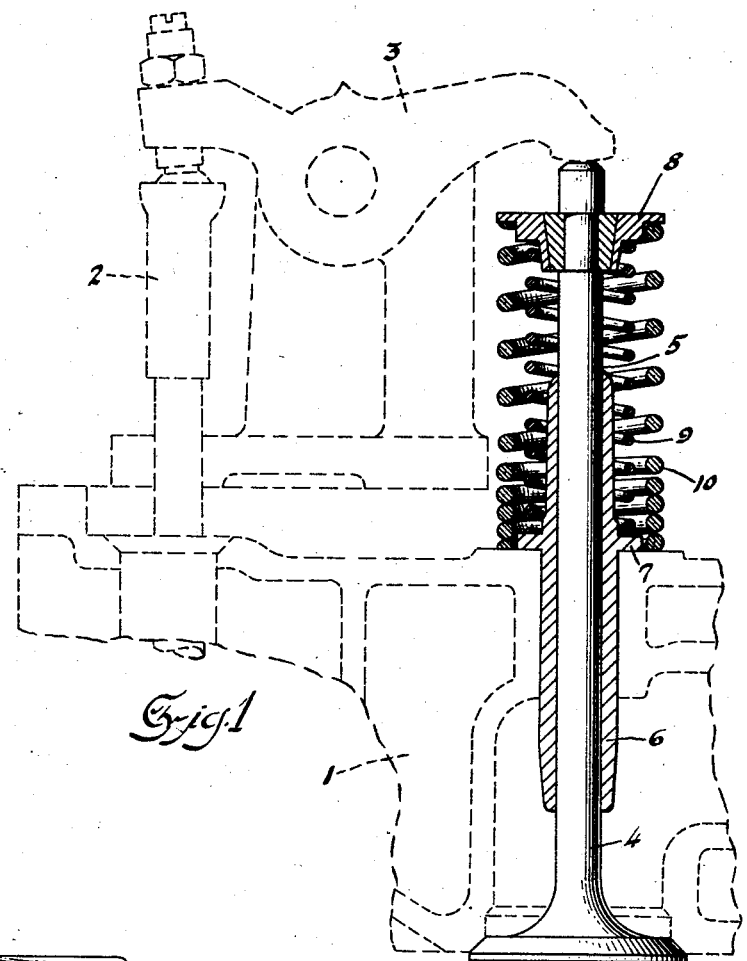
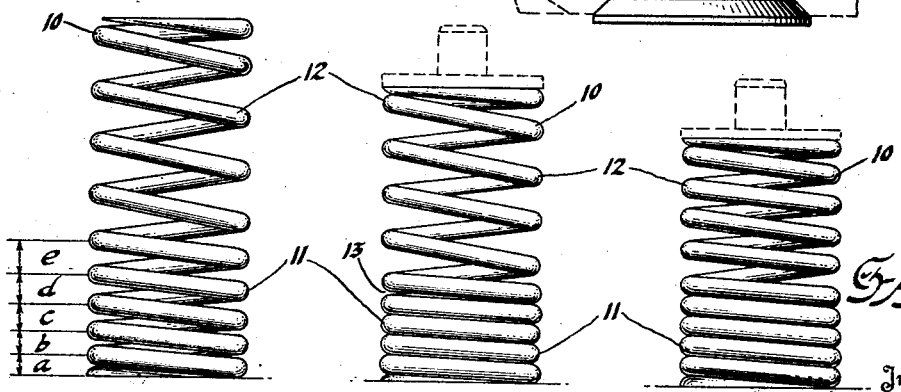
Inventors,
Benton Cataline &
Eugene C. Richard Patented July 21, 1931

1,815,612

UNITED STATES PATENT OFFICE

BENTON CATALINE AND EUGENE C. RICHARD, OF FLINT, MICHIGAN, ASSIGNORS TO GENERAL MOTORS CORPORATION, OF DETROIT, MICHIGAN, A CORPORATION OF DELAWARE

VALVE SPRING

Original application filed December 10, 1926, Serial No. 153,822. Divided and this application filed October 19, 1927. Serial No. 227,154.

This invention relates to motor vehicles and particularly to the springs used in the operation of cam actuated valves of the internal combustion engines thereof.

This application is a division of our prior application Ser. No. 153,822, filed December 10, 1926, and differs therefrom in that the lower coils of the spring of the present application have a progressively varying pitch instead of a constant one.

Owing to the high speed at which modern internal combustion engines must operate, it has been determined that the valve spring must build up a maximum spring pressure in 1/180 of a second at 3600 R. P. M. motor speed, and this pressure must be immediately released and the mechanism brought to a stop in an equal length of time.

As each spring has an appreciable weight in each coil there is a tendency for each coil, due to its inertia, to remain behind when the spring is released and this tendency to lag will be increased as the weight and number of coils is increased. This condition in connection with the rapid reversal of action of the spring causes a series of vibrations within the spring which is known as "dancing" and this "dancing" produces objectionable noise, especially when it synchronizes with some other sound or vibration of the motor, and also causes a fluttering of the valve. This "dancing" is injurious to the life of the spring and prevents the valve from properly seating.

To eliminate this "dancing" and its objectionable effects it is necessary to reduce the size of the wire, the size of the coils, or the number of the coils, and it is the object of this invention to make it possible within a given height, to produce a valve spring which will fulfill certain given requirements with respect to loads and deflections and at the same time produce less "dancing" of the coils of the spring.

With the conventional spring there is always throughout its range of action the full number of coils with their corresponding weight to cause "dancing" of the coils. It has been found through a series of experiments with springs of different sized wire and number of coils that the weight of the wire in the free coils directly affected the "dancing" of the coils. By decreasing the size of the wire and number of active coils the "dancing" diminished and began to show only at certain intervals of speed. Therefore, it became the problem to produce a spring in which the "dancing," if it occurred at all, was outside the driving range of the motor.

We found that if we had a spring of several coils of light wire, which would close solid just before the maximum opening of the valve, and placed it on a spring of one or two coils of heavy wire, the "dancing" of the coils was practically nil, but the one or two coils were taking all of the load and the variations in manufacture were such that the stress and load were built up to such an extent that the coils broke. These experiments led to our discovery that we could place the coils that were to compress solid on the bottom and make the free or upper coils of a different pitch and thus have a continuous spring as is shown in the drawings.

In the conventional type of valve spring, the frequency of natural vibration of the coils of the spring is quite definite so periods of vibration occur when the springs are operating in connection with the valve mechanism of gasoline engines. The form of the operating cam has an influence upon the violence of these periods and with certain structures critical points occur at quite frequent intervals along the speed range.

A remedy for this condition consists of placing closed coils at one end of the spring. When a spring of this type is observed in operation by means of a suitable instrument, it is found that at the critical points where the coils of the spring oscillate violently, the closed coils open slightly which has the effect of damping the vibration of the spring. In order for the closed coils to operate, however, the spring vibration must be so violent as practically to lift the spring clear of the valve spring retainer.

It seems more desirable, therefore, to form the end coils in a helix of decreasing pitch as the end is approached. The end three coils, for example, would decrease in pitch from a normal spacing between coils down to a point where the coils were touching at the very end. When the spring is compressed by the valve spring retainer, some of the coils of decreased pitch will be closed, but the tension will be present in the wire so when any of the normal pressure is removed the closed coils will break contact for a certain distance, depending upon the extent of the disturbance from normal operation.

With this structure, therefore, when there is the slightest tendency to "dance" or surge, the presence of "dancing" or surging will automatically vary the length of the spring so as to change its periodicity. Aside from this, the opening and closing of a portion of the coils, with oil present, will have a damping effect on the surge. It will not be necessary for the surge to become violent in order that the remedy may become effective.

In the drawings:

Figure 1 is a section through the valve operating means of an internal combustion engine having a plurality of cylinders.

Figure 2 shows a free length of untensioned view of our spring.

Figure 3 shows the spring compressed as it appears in valve-closed position, the arrow representing the load.

Figure 4 is a view similar to Figure 3 but with the valve in open position.

In the drawings 1 designates an internal combustion engine of the conventional type, 2 one of the stems operated from the cam shaft (not shown), 3 a rocker for operating the valve stem 4, having the valve 5 and operating through the sleeve 6. This sleeve 6 has an integral collar 7 seated on the engine block and confined between this collar and a second collar 8, secured to the upper end of the valve stem 4, is the spring 9, while a second spring 10, which forms the object of our invention, is confined between the engine block and the collar 8, and surrounds the spring 9.

As will be seen from Figure 2, which shows the free length of the spring, the lower coils 11 are of a different pitch than the upper or active coils 12. This pitch increases from the end of the spring at $a$ upward toward the middle, the pitch of the successive coils being slightly greater than the preceding one.

As shown in Figure 2 the pitch at the two end coils is equal to the distance $a$, while at the second and third coils the pitch is equal to distance $b$, which is somewhat greater than the distance $a$. The distances indicated at $c$, $d$ and $e$ are each progressively greater giving a progressively increased variation or difference in the pitch of the coils from the lower end toward the center. The number of coils to which this variation in pitch is applied will depend on the characteristics or the demands upon the particular engine with which the spring is used. For ordinary purposes, three coils are ample.

When partially compressed within the required lengths as shown in Figures 3 and 4 the lower coils 11 are shut or solid, while the upper or active coils are left spaced from each other. As a result when the spring is in the valve open position as in Figure 4, the lower coils 11 are closed or shut solid leaving the upper coils 12 to take care of the load deflection necessary to operate the valves. As is shown at 13 in Figure 3, the uppermost coil of the lower coils 11 may be slightly spaced from its adjacent coil, although this is not absolutely necessary as all the coils 11 may be closed.

With the spring deflections as shown in Figures 3 and 4 only the upper spaced coils 12 will tend to produce "dancing" or produce a surge, but by the application of our new spring with the progressively varying pitch, any "dancing" or surge which may occur will be beyond the driving range of the motor.

The loads required at valve open and valve closed position, the height to be occupied by the spring, and the allowable fiber stress, will determine the size of the wire, the diameter of the coil, total number of coils, and the number of coils to be closed.

In designing a spring for an engine it is necessary to have a certain load at valve closed position, as shown in Figure 3, a larger predetermined load at valve open position, Figure 4, and maintain a fiber stress which is not so excessive.

While we prefer to have a progressively increasing pitch variation from the end toward the center of the spring, this pitch variation may be reversed and increase from an intermediate point on the spring toward the end.

The lower coils need not necessarily be wound with a variable pitch but may have a combination of constant and variable pitches and this is equally true of the upper coils. It is also within the scope of the invention to place the progressively variable coils at the top of the spring and the constant coils at the bottom or in reverse of the position shown in the drawings.

We claim:

1. In combination with a reciprocable valve, a coil spring for moving said valve in one direction, said spring having some of its coils of progressively increasing pitch, said progressively increasing pitch coils being closed when the spring is in operative position.

2. In combination with a reciprocable valve, a coil spring for moving said valve in one direction, said spring having some of its coils of progressively increasing pitch, and the remaining coils of a constant pitch, said progressively increasing pitch coils being closed when the spring is in operative position.

In testimony whereof we affix our signatures.

BENTON CATALINE.
EUGENE C. RICHARD.